(12) United States Patent
Wittenschlaeger (10) Patent No.: US 10,670,104 B2
(45) Date of Patent: Jun. 2, 2020

(54) VARIABLE FRICTION TUNING FOR SHOCK ABSORPTION

(71) Applicant: Fox Factory, Inc., Scotts Valley, CA (US)

(72) Inventor: Thomas Wittenschlaeger, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 203 days.

(21) Appl. No.: 15/490,794

(22) Filed: Apr. 18, 2017

(65) Prior Publication Data

US 2018/0298975 A1 Oct. 18, 2018

(51) Int. Cl.
| | |
|---|---|
| *F16F 7/09* | (2006.01) |
| *F16F 9/48* | (2006.01) |
| *F16F 9/32* | (2006.01) |
| *F16F 9/36* | (2006.01) |
| *F16F 9/58* | (2006.01) |
| *F16F 7/08* | (2006.01) |
| *C23F 1/00* | (2006.01) |

(52) U.S. Cl.
CPC ............... *F16F 9/48* (2013.01); *F16F 7/085* (2013.01); *F16F 7/09* (2013.01); *F16F 9/3214* (2013.01); *F16F 9/3235* (2013.01); *F16F 9/362* (2013.01); *F16F 9/58* (2013.01); *C23F 1/00* (2013.01); *F16F 2222/04* (2013.01); *F16F 2222/12* (2013.01); *F16F 2226/023* (2013.01); *F16F 2226/026* (2013.01); *F16F 2230/02* (2013.01)

(58) Field of Classification Search
CPC .... F16F 7/08; F16F 7/082; F16F 7/085; F16F 7/087; F16F 7/09; F16F 2222/04; F16F 9/516
See application file for complete search history.

(56) References Cited

U.S. PATENT DOCUMENTS

| | | |
|---|---|---|
| 5,183,137 A | 2/1993 | Siwek et al. |
| 5,884,734 A | 3/1999 | Hiramoto et al. |
| 6,612,408 B2 | 9/2003 | Serkh et al. |
| 8,146,720 B2 | 4/2012 | Tikhonenko et al. |
| 2006/0219505 A1 | 10/2006 | Zdeb |
| 2006/0219506 A1 | 10/2006 | Zdeb |
| 2009/0072453 A1 | 3/2009 | Cotter et al. |
| 2009/0200126 A1 | 8/2009 | Kondo et al. |

(Continued)

FOREIGN PATENT DOCUMENTS

DE 10 2007 023 303 * 11/2008 ............ F15B 15/227

OTHER PUBLICATIONS

Machine translation of DE 10 2007 023 303 (no date).*

(Continued)

*Primary Examiner* — Nicholas J Lane (57) ABSTRACT

An exemplary shock absorber includes a damper tube, a damper piston, a piston shaft, and at least two different surface treatments. The damper tube includes an interior surface. The damper piston includes a piston surface that engages the interior surface. The piston shaft couples with the damper piston and includes a shaft surface that engages a fourth surface. The at least two different surface treatments are disposed on at least one of the interior surface and the shaft surface and create a corresponding plurality of coefficients of friction with at least one of the piston surface and the fourth surface respectively.

4 Claims, 7 Drawing Sheets

(56) References Cited

U.S. PATENT DOCUMENTS

2015/0330473 A1* 11/2015 Lombrozo .............. F16F 6/005
                                                            248/569
2017/0370437 A1* 12/2017 Xu .......................... D06F 37/22

OTHER PUBLICATIONS

Drummond, "Electric-Field-Induced Friction Reduction and Control", PFL 109, 154302, Physical Review Letters, American Physical Society, Oct. 11, 2012, 5 Pages.

Rashwan, "Micro Surface Texturing for Friction Control", Electronic Theses and Dissertations, University of Windsor, Scholarship at UWindsor, Feb. 26, 2013, 196 Pages.

European Search Report, European Patent Application No. 18168080.2, dated Aug. 22, 2018, 7 Pages.

* cited by examiner

VARIABLE FRICTION TUNING FOR SHOCK ABSORPTION

FIELD

The invention generally relates to shock absorbers and more specifically to systems for variable friction tuning for shock absorption.

BACKGROUND

Current shock absorption technologies include fluid dampers that vary the amount of damping force provided to a sprung mass of a system by channeling fluid through various passageways and valves to constrict fluid flow, increase pressures, and bypass damping fluid chambers. Various damping characteristic curves may result from tuning the sizes and locations of orifices and the stiffness of valve shims.

Current fluid dampers are constructed of uniform damper tubes, damper pistons, piston shafts, seals, wear bands, and bearings that engage one another frictionally. The surface treatment is uniform along the length of the inner surface of the damper tube and the outer surface of the piston shaft. The damper pistons, seals, wear bands, and bearings engage the damper tube and piston shaft and include both a static friction and a kinetic friction. Both frictions depend upon the surface to surface interaction between the piston (or piston wear band) and the damper tube or between the shaft and a seal and/or bearing surface.

BRIEF DESCRIPTION OF THE DRAWINGS

Aspects of the present invention are illustrated by way of example, and not by way of limitation, in the accompanying drawings, wherein.

DESCRIPTION OF EMBODIMENTS

The description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and the like have not been described in detail as not to unnecessarily obscure aspects of the present disclosure.

The architecture described herein takes advantage of frictional forces and reduces the number of complex fluid flow solutions found in today's hydraulic dampers. One embodiment creates different zones within the damper where frictional forces between the engaging surfaces of the hydraulic damper vary. At least two different zones, utilize various surface treatment techniques to achieve micro-textured surfaces that exhibit varying coefficients of friction (static and kinetic). The surface treatments are applied to the inner surface of the damper tube's working chamber, to the outer surface of the piston shaft, or a combination thereof.

For example, in one embodiment, a middle portion of the damper tube could be treated to achieve a first surface treatment to drastically reduce breakaway friction forces when the damper has been stationary for a prolonged period. This middle portion would be the "ride zone" in which the damper piston most often travels. A first adjacent portion just above the middle portion is treated to achieve a second surface treatment that provides a higher kinetic friction force. This first adjacent portion will experience faster damper piston velocities that the middle portion from severe compression events. In one embodiment, portions at the top and bottom of the damper tube are also treated to achieve a third surface treatment to further increase kinetic friction and create a "virtual" bottom out or top out system that slows the damper piston substantially as full compression or extension occurs.

Thus, the damper can operate with far fewer valve architectures and even be simplified to only a main piston valve or base valve configuration. In one embodiment, the system is used in conjunction with existing technologies to provide more uniform response from the damper. The surfaces are treated in a fashion to alter the frictional force based on temperature (increased damping from friction forces for example as the fluid temperature increase and/or cavitation begins).

In one embodiment, the fluid damper shock absorber includes a damper tube, a damper piston, a piston shaft, and at least two different surface treatments. The damper tube includes an interior surface. The damper piston includes a piston surface that engages the interior surface. The piston shaft couples with the damper piston and includes a shaft surface that engages a fourth surface. The at least two different surface treatments are disposed on at least one of the interior surface and the shaft surface and create a corresponding plurality of coefficients of friction with at least one of the piston surface and the fourth surface respectively.

In other features, the fourth surface is a shaft guide surface, the interior surface of the damper tube, or a shaft seal surface. In other features, the damper piston includes a wear band around an outer circumference of the damper piston and the piston surface includes an exterior surface of the wear band.

In yet other features, the surface treatments include at least one of a coating, a vibro-rolled, a chemically etched, an abrasive machined, a honed, a reactive ion etched, a high energy chemical plasma etched, a photolithographic deposited, an abrasive jet machined, an excimer laser beam machined, a vibro-mechanical textured, a laser surface textured, an electro-plated, an evaporative deposited surface and a polyelectrolyte coating treatment.

In yet other features, the surface treatments include a first surface treatment at a first end of the interior surface of the damper tube having a first coefficient of friction with the piston surface. In other features, the surface treatments include a second surface treatment adjacent the first surface treatment having a second coefficient of friction with the piston surface that is less than the first coefficient of friction. In still other features, the surface treatments include a third surface treatment adjacent the second surface treatment having a third coefficient of friction with the piston surface that is less than the second coefficient of friction. In yet other features, the surface treatments include a third surface treatment adjacent the second surface treatment having a third coefficient of friction with the piston surface that is greater than the second coefficient of friction.

Another exemplary fluid damper shock absorber includes a damper tube, a damper piston, a first surface treatment, and a second surface treatment. The damper tube includes an interior surface. The damper piston includes a piston surface that engages the interior surface. The first surface treatment is disposed at a first end of the interior surface of the damper tube and includes a first coefficient of friction with the piston surface. The second surface treatment is disposed adjacent the first surface treatment and includes a second coefficient of friction with the piston surface that is less than the first coefficient of friction.

In other features, the damper piston includes a wear band around an outer circumference of the damper piston and the piston surface includes an exterior surface of the wear band.

In yet other features, the surface treatments include a third surface treatment adjacent the second surface treatment having a third coefficient of friction with the piston surface that is greater than the second coefficient of friction. In still other features, the surface treatments include a third surface treatment adjacent the second surface treatment having a third coefficient of friction with the piston surface that is greater than the second coefficient of friction.

In yet other features, the surface treatments include at least one of a coating, a vibro-rolled, a chemically etched, an abrasive machined, a honed, a reactive ion etched, a high energy chemical plasma etched, a photolithographic deposited, an abrasive jet machined, an excimer laser beam machined, a vibro-mechanical textured, a laser surface textured, an electro-plated, an evaporative deposited surface and a polyelectrolyte coating.

Another exemplary fluid damper shock absorber includes a damper tube, a damper piston, a piston shaft, a first surface treatment, and a second surface treatment. The damper tube includes an interior surface. The damper piston includes a piston surface that engages the interior surface. The piston shaft couples with the damper piston and includes a shaft surface that engages a fourth surface. The first surface treatment is disposed at a first end of the piston shaft and includes a first coefficient of friction with the fourth surface. The second surface treatment is disposed adjacent the first surface treatment and includes a second coefficient of friction with the fourth surface that is less than the first coefficient of friction.

In yet other features, the surface treatments include a third surface treatment adjacent the second surface treatment having a third coefficient of friction with the fourth surface that is greater than the second coefficient of friction. In still other features, the surface treatments include a third surface treatment adjacent the second surface treatment having a third coefficient of friction with the fourth surface that is greater than the second coefficient of friction.

In yet other features, the surface treatments include at least one of a coating, a vibro-rolled, a chemically etched, an abrasive machined, a honed, a reactive ion etched, a high energy chemical plasma etched, a photolithographic deposited, an abrasive jet machined, an excimer laser beam machined, a vibro-mechanical textured, a laser surface textured, an electro-plated, an evaporative deposited surface and a polyelectrolyte coating.

Figure 1:
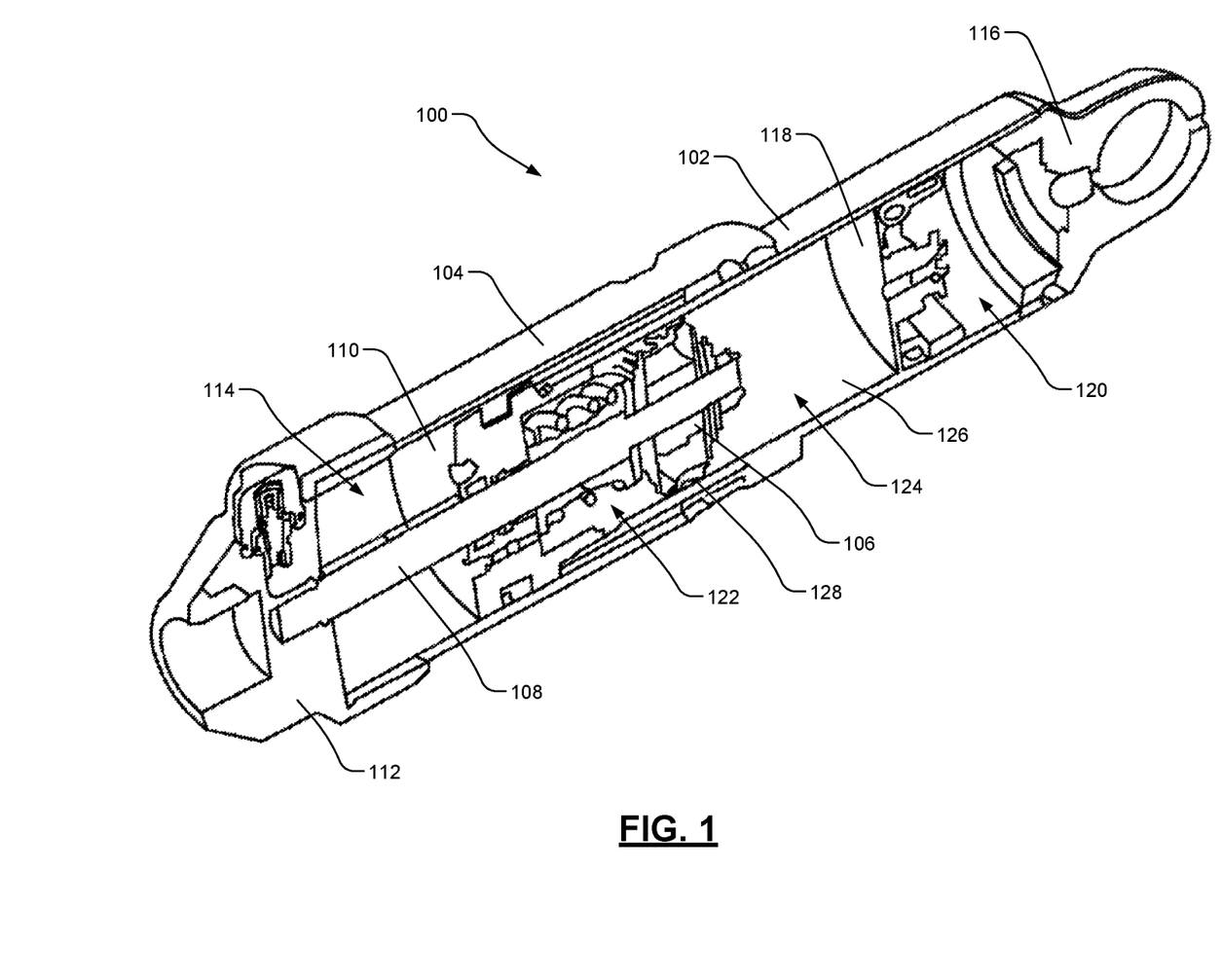
FIG. 1 is cross-sectional perspective view of a shock absorber including uniform engaging surfaces, in accordance with an embodiment.

Referring to FIG. 1, a cross-sectional perspective view of a shock absorber including uniform engaging surfaces is shown in accordance with an embodiment. In one embodiment, an exemplary fluid damper shock absorber 100 includes a damper portion and an integrated gas spring portion. The damper portion includes a damper tube 102, a gas spring tube 104, damper piston 106, and a piston shaft 108. The damper tube 102 is filled with a damper fluid. The damper tube 102 is sealed at a first end by a gas spring piston 110 which together with gas spring tube 104 and first end cap 112 forms a gas spring chamber 114 filled with a gas such as air or nitrogen. The damper tube 102 is further sealed at a second end by a second end cap 116 to fully enclose the damper fluid. A floating piston 118 is disposed between the damper piston 106 and the second end cap 116 to form a pressurized gas chamber 120. The damper piston 106 divides the interior portion of the damper tube 102 into a rebound chamber 122 and a compression chamber 124. An interior surface 126 of the damper tube 102 engages with the damper piston 106 or in some embodiments, a wear band 128 as the piston shaft 108 is forced back and forth along its linear axis, compressing and extending the shock absorber 100 in response to applied forces from, for example an unsprung mass such as a wheel traveling along a road surface.

Figure 2:
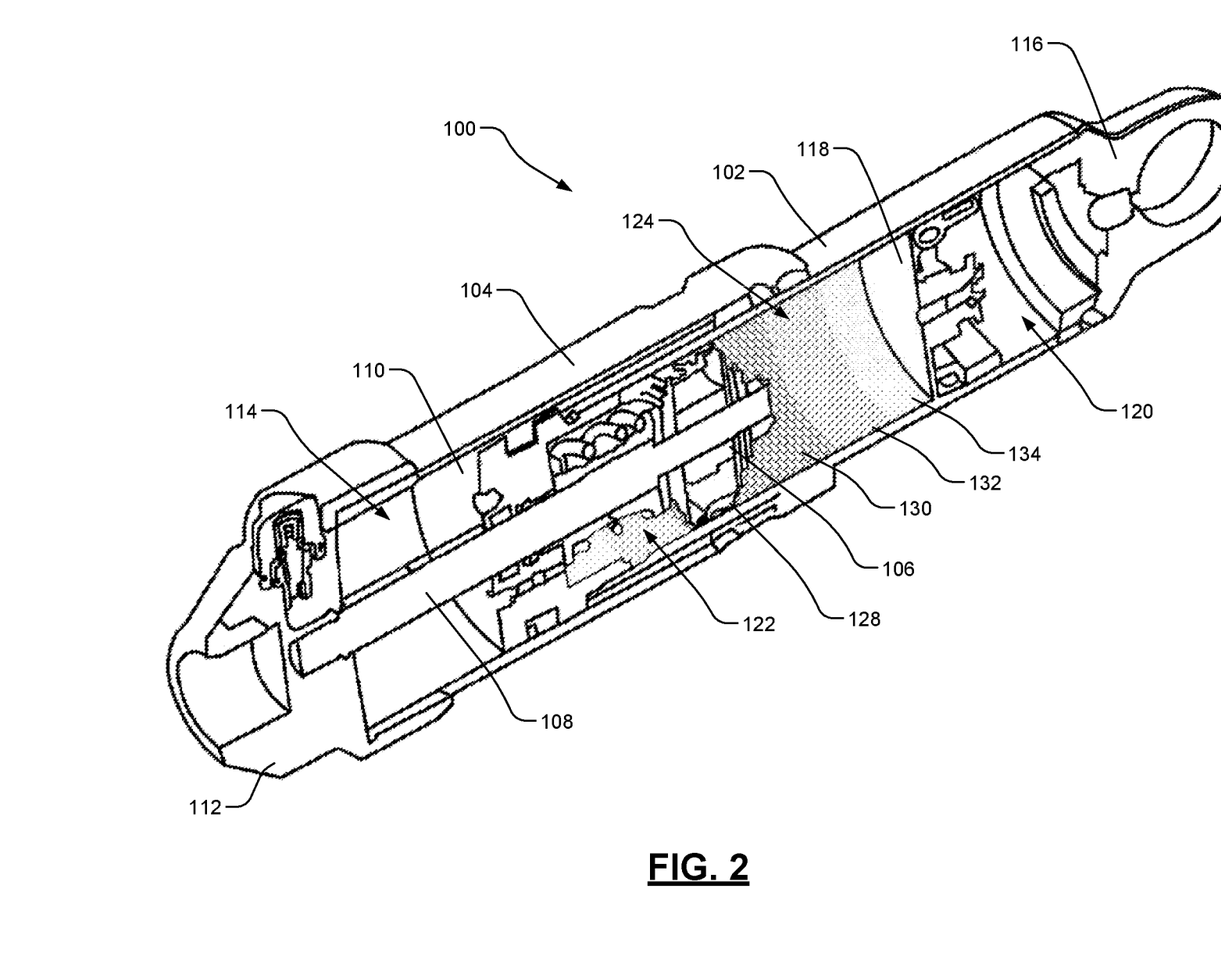
FIG. 2 is cross-sectional perspective view of the shock absorber including a plurality of surface treatments on an interior surface of a damper tube, in accordance with an embodiment.

Referring now to FIG. 2, a cross-sectional perspective view of the shock absorber including a plurality of surface treatments on an interior surface of a damper tube is shown in accordance with an embodiment. In one embodiment, the shock absorber 100 further includes surface treatments such as surface micro texturing, coatings, or platings on the interior surface 126 of the damper tube 102. For example, the interior surface 126 includes a first surface treatment 130 along a middle portion of the damper tube 102 corresponding to a "ride zone" of an associated vehicle on which the shock absorber 100 is installed. The interior surface 126 includes a second surface treatment 132 along a first adjacent portion next to the middle portion of the damper tube 102 corresponding to an increased damping zone of the associated vehicle. The interior surface 126 includes a third surface treatment 134 along an end portion next to the adjacent portion of the damper tube 102 corresponding to a heavy damping zone of the associated vehicle. Each surface treatment 130-134 is mirrored on the opposite side of the damper piston 106. Surface treatments is developed for various damping needs along the entire length of the damper tube 102 in both the rebound chamber 122 and the compression chamber 124.

Figure 3A:
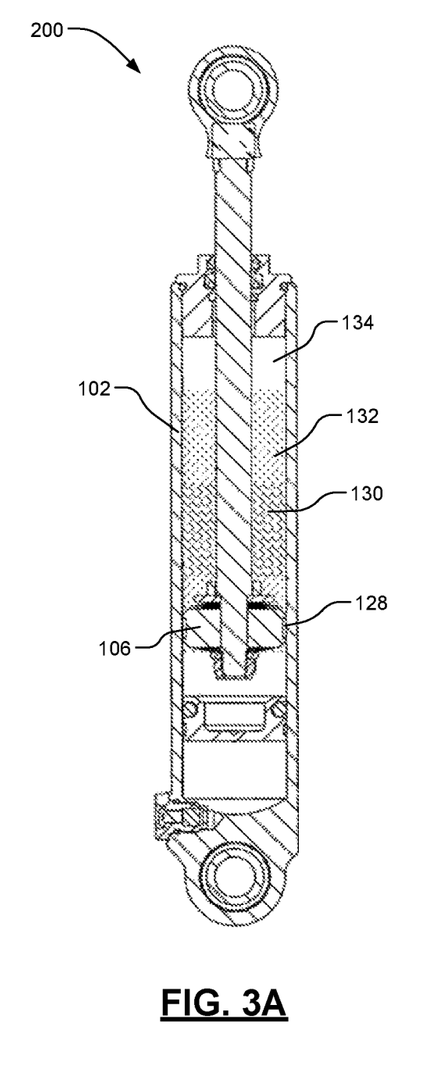
FIGS. 3A and 3B are cross-sectional views of another shock absorber including a plurality of surface treatments on an interior surface of a damper tube in a compressed position and an extended position respectively, in accordance with an embodiment.
Figure 3B:
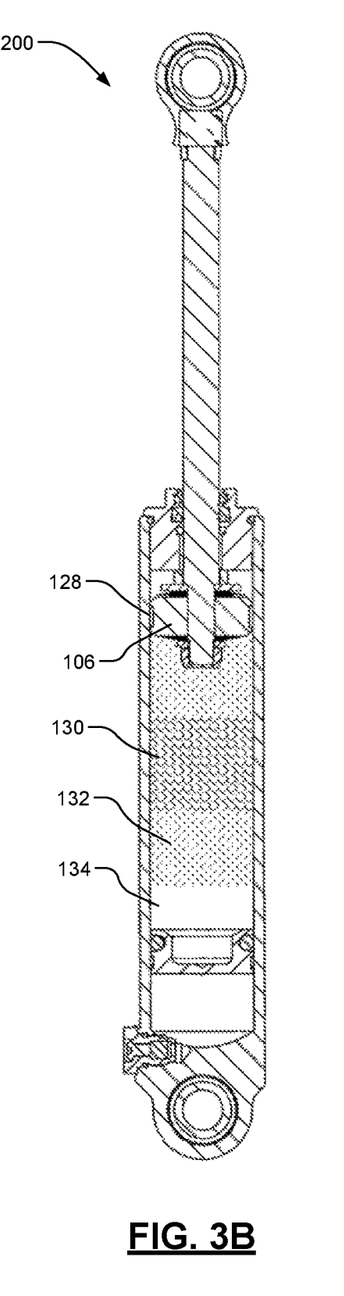

Referring now to FIGS. 3A and 3B, cross-sectional views of another shock absorber including a plurality of surface treatments on an interior surface of a damper tube in a compressed position and an extended position respectively are shown in accordance with an embodiment. In one embodiment, shock absorber 200 includes a damper portion without the gas spring portion of shock absorber 100. Similarly, to shock absorber 100, the damper tube 102 includes multiple surface treatments 130, 132, and 134. In FIG. 3A, the shock absorber 200 is shown in a fully compressed or "bottomed out" position in which the damper piston 106 or the wear band 128 engages with the third surface treatment 134 on the interior surface 126. In FIG. 3B, the shock absorber 200 is shown in a fully extended or "topped out" position in which the damper piston 106 or the wear band 128 engages with the third surface treatment 134 on the interior surface 126. In use, the damper piston 106 or the wear band 128 will engage with each of the surface treatments. Each surface treatment provides two different frictional forces—static friction and dynamic friction. In one embodiment, each surface treatment provides the same coefficient of friction regardless of the direction of movement of the damper piston 106. Alternatively, in another embodiment, each surface treatment provides two different coefficients of friction depending on the direction of movement of the damper piston 106.

Figure 4:
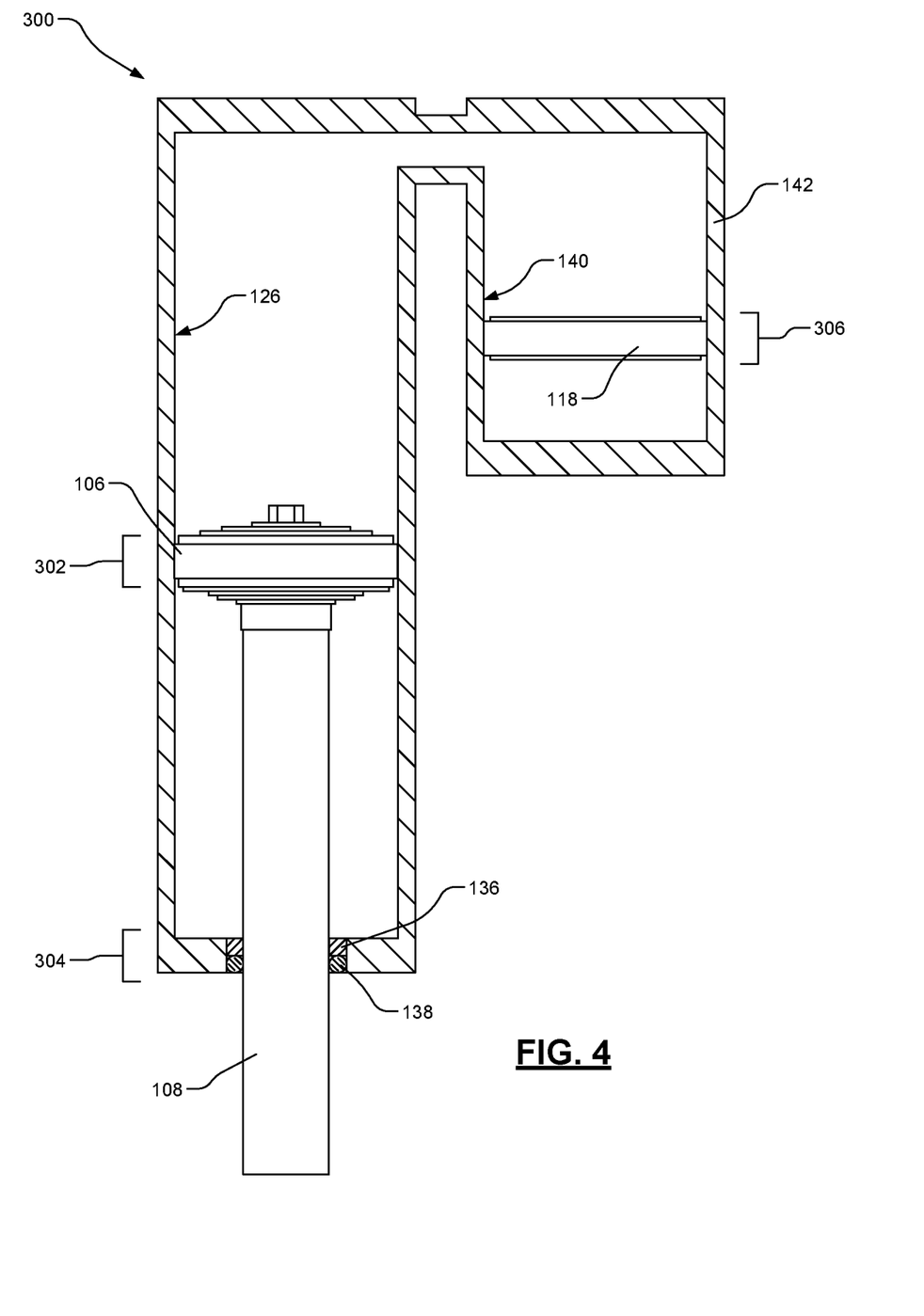
FIG. 4 is a block diagram of another shock absorber including a plurality of regions for tuning coefficients of friction between mating surfaces, in accordance with an embodiment.

Referring now to FIG. 4, a block diagram 300 of a shock absorber (such as shock absorber 100 or shock absorber 200) including a plurality of regions for tuning coefficients of friction between mating surfaces is shown in accordance with an embodiment. In one embodiment, FIG. 4 illustrates at least three regions for tuning coefficient of friction between surfaces. A first region 302 includes mating surfaces of the damper piston 106 or wear band 128 and the interior surface 126 of the damper tube 102. A second region 304 includes mating surfaces of the piston shaft 108 and a shaft guide 136 or a shaft seal 138. A third region includes mating surfaces of the floating piston 118 or a seal surrounding the floating piston and another interior surface 140 of a reservoir 142. Alternatively, the interior surface 140 is an interior surface of the pressurized gas chamber 120. Each of the regions 302, 304, and 306 includes one or more coefficient of static friction $\mu_s$ and more or more coefficient of kinetic friction $\mu_k$.

Figure 5:
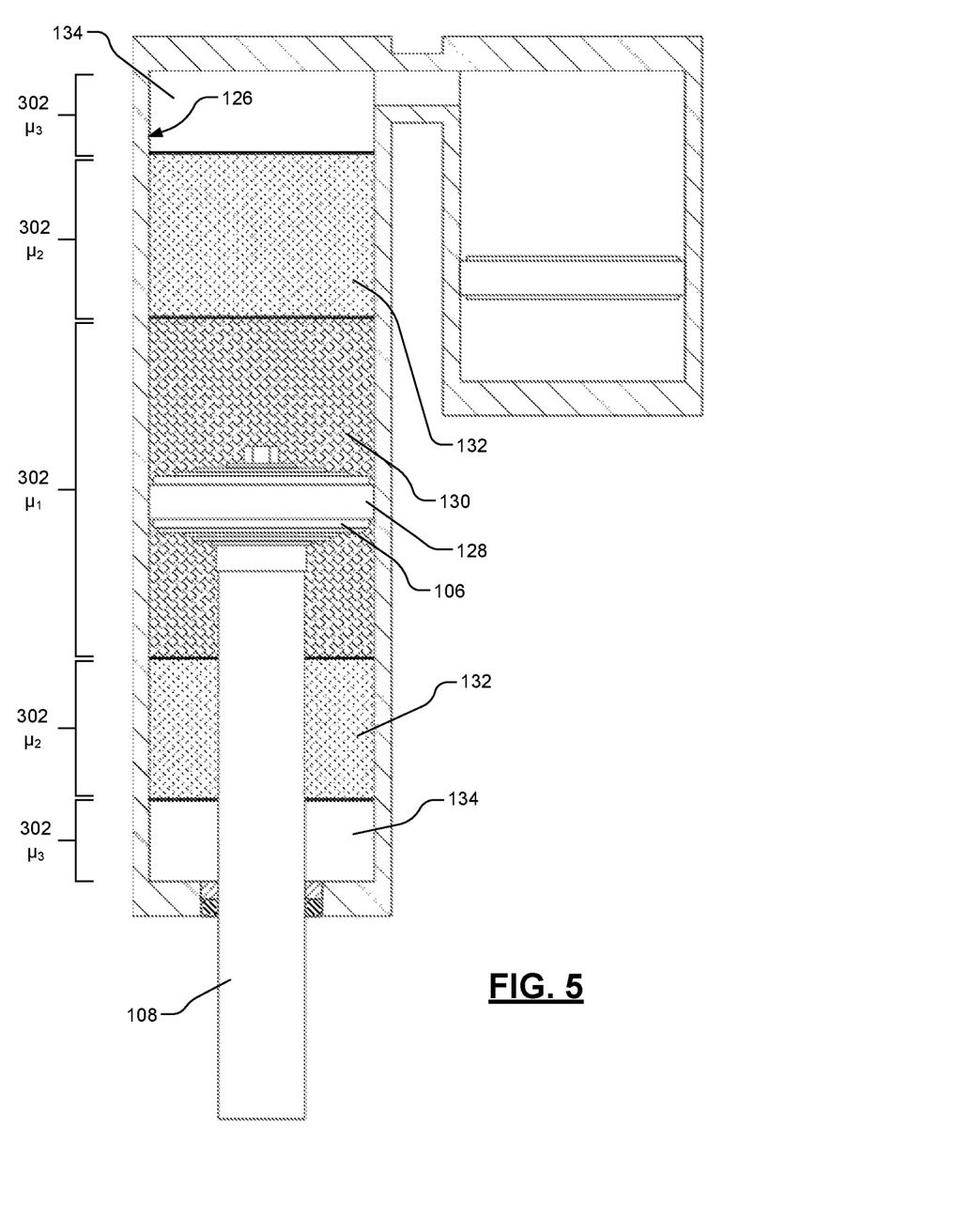
FIG. 5 is a block diagram of a shock absorber illustrating a plurality of surface treatments for creating a plurality of coefficients of friction between mating surfaces a first region, in accordance with an embodiment.

Referring now to FIG. 5, a block diagram of a shock absorber illustrating a plurality of surface treatments for creating a plurality of coefficients of friction between mating surfaces a first region is shown in accordance with an embodiment. In one embodiment, the damper tube 102 includes three different surface treatments 130, 132, and 134. The piston shaft 108 includes a substantially uniform surface. Together, the first regions 302 include coefficient of frictions $\mu_1$, $\mu_2$, and $\mu_3$ respectively and for both static and kinetic friction. Here, the wear band 128 engages the various surface treatments 130-134.

Figure 6:
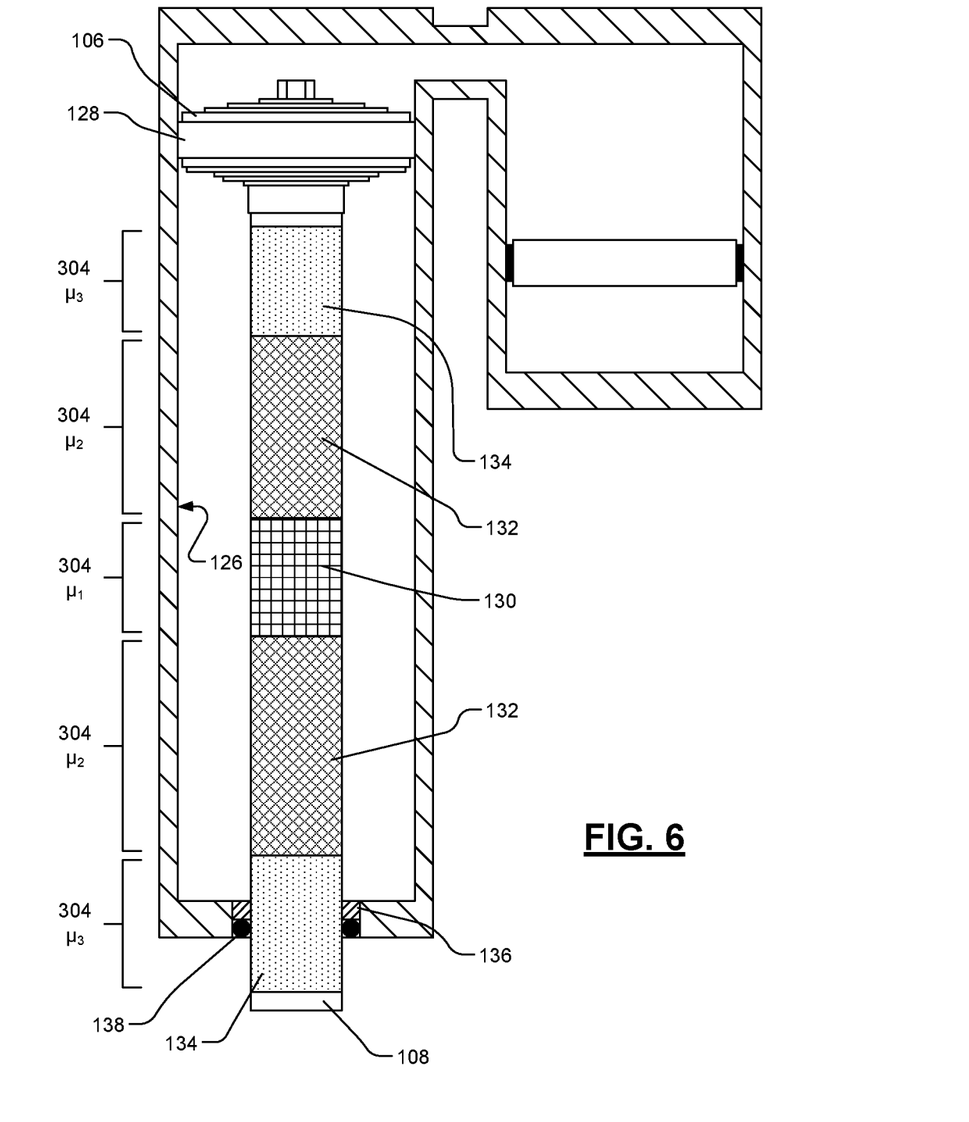
FIG. 6 is a block diagram of a shock absorber illustrating a plurality of surface treatments for creating a plurality of coefficients of friction between mating surfaces in a second region, in accordance with an embodiment.

With reference now to FIG. 6, a block diagram of a shock absorber illustrating a plurality of surface treatments for creating a plurality of coefficients of friction between mating surfaces in a second region is shown in accordance with an embodiment. In one embodiment, the damper tube 102 includes a substantially uniform surface while the piston shaft 108 includes various surface treatments 130-134. Together, second regions 304 include coefficient of frictions $\mu_1$, $\mu_2$, and $\mu_3$ respectively and for both static and kinetic friction. In some examples, both the damper tube 102 and the piston shaft 108 include surface treatments 130-134. Although not shown, the third region 306 will likewise include surface treatments 130-134 between the floating piston 118 and interior surface 140 and are combined with surface treatments on the interior surface 126 of the damper tube and/or with surface treatments on the piston shaft 108.

The surface treatments 130-134 are formed throughout the circumference and along a predetermined length of the interior surface 126 of the damper tube 102 forming cylindrical sections. Alternatively, the surface treatments 130-134 are formed along portions of the circumference and along a predetermine length of the interior surface 126 forming partial cylindrical sections. Any number of patterns is used to form the surface treatments 130-134 including helical, striped, and the like to achieve the desired level of friction for a given position of the damper piston 106 within the damper tube 102.

Examples of surface treatments which are used to create the surface treatments 130-134 include but are not limited to coatings, vibro-rolling, chemical etching, abrasive machining, honing to generate micro-grooves, reactive ion etching (RIE), high energy chemical plasma, photolithographic techniques, abrasive jet machining (AJM), excimer laser beam machining (LBM), vibro-mechanical texturing (VMT), laser surface texturing (LST), electro-plating, electric-field-induced polyelectrolyte coatings, and evaporative deposition.

Figure 7:
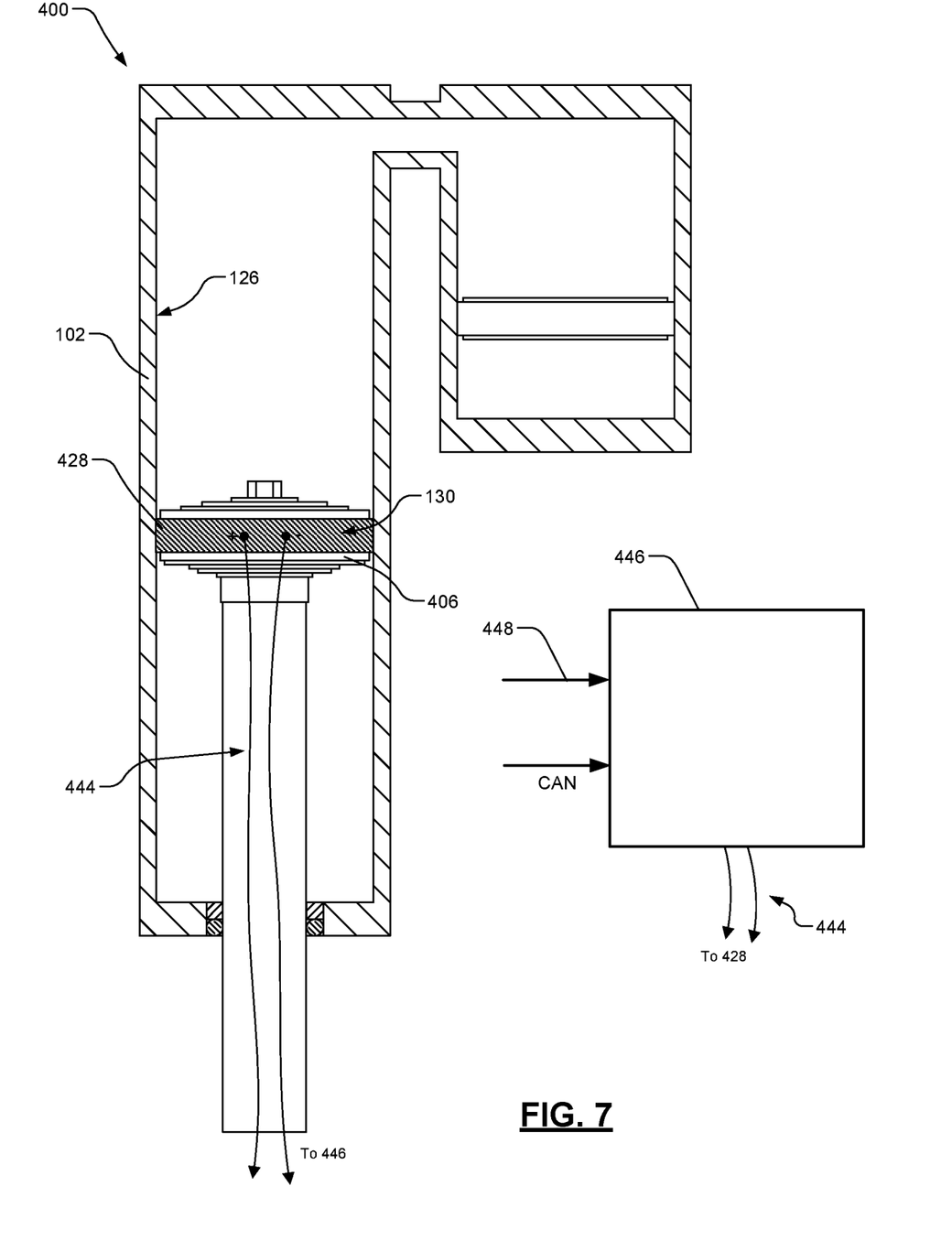
FIG. 7 is a block diagram of a shock absorber illustrating a variable surface treatment for creating a plurality of coefficients of friction between mating surfaces, in accordance with an embodiment.

Referring now to FIG. 7, a block diagram of a shock absorber illustrating a variable surface treatment for creating a plurality of coefficients of friction between mating surfaces is shown in accordance with an embodiment. In one embodiment, FIG. 7 includes a damper piston 406 that is selectively charged with a variable voltage. The damper piston 406 or a wear band 428 disposed about the circumference of the damper piston 406 engages the interior surface 126 of the damper tube 102. At least one of the interior surface 126, the damper piston 406, and the wear band 428 includes the surface treatment 130 which includes a polyelectrolyte coating. Electricity is applied to the damper piston 406 via leads 444. A variable voltage V is applied to the damper piston 406 using alternating current. As the voltage is varied, the coefficient of friction of the engaging interior surface 126 and damper piston 406 or wear band 428 varies. The voltage is set by a user to one or more predetermined values. Each of the predetermined values corresponds to a desired level of friction.

A control system is provided to regulate the variable voltage V based on various parameters associated with vehicle operation or shock absorber characteristics. For example, a controller 446 receives a plurality of signals from sensors 448 including a temperature T associated with operation of the shock absorber, a cavitation measurement C, piston velocity PV, piston position PP, a vehicle speed VS, or other signals. In one embodiment, the controller 446 is integral with another controller such as a vehicle master controller or engine control unit (ECU). Alternately, in one embodiment, the controller 446 is a standalone unit. The controller 446 controls voltages for one or more shock absorbers. The controller 446 is linked to one or more other vehicle controllers via a CAN bus or other vehicle network communications.

Based on the data, the controller 446 generates a voltage or current value to be applied to the damper piston 406. For example, in colder weather and/or after a prolonged period of rest, many shock absorbers experience higher levels of friction between the damping piston 106 and interior surface 126 of the damper tube 102. Hydraulic damping fluid increases in viscosity as the temperature decreases. Damper tubes also decrease in diameter as the metal contracts due to lower temperatures. These and other natural phenomenon result in reduced ride quality, harshness, unwanted noises, increased component wear, and other undesirable side effects. The control system compensates for the temperature T of the shock absorber by decreasing the coefficient of friction. For example, when the sensed or modeled temperature of the damper tube 102 is below a threshold temperature T1, the controller 446 begins to apply voltage V to decrease the coefficient of friction.

The voltage V is increased or decreased during normal temperature operation of the shock absorber as well to compensate for a variety of conditions in which increased or decreased damping forces are desired including but not limited to: steady-state high vehicle speed (highway driving), off-road situation-specific events (rough road, low vehicle speed rock crawl, jumps, landings), evasive maneuvering (rapid turning events), body roll, body pitch/heave, body yaw, and the like.

A method for selecting a plurality of surface treatments includes determining desired static breakaway forces for the damper piston 106 in a plurality of positions within the damper tube 102, determining desired damping forces for the damper piston 106 in a plurality of positions within the damper tube 102, determining desired damping forces for the damper piston 106 for piston shaft 108 velocity ranges, determining desired damping forces for the damper piston 106 for a direction of movement, and selecting a surface treatment to achieve the desired breakaway force and damping force for each of the positions, velocity ranges, and direction of movement.

For example, in a ride zone or first portion of the damper tube 102, it is desirable to include a first surface treatment 130 with a first coefficient of static friction that is the lowest of all and a first coefficient of kinetic friction that is lowest of all. In one embodiment, the first surface treatment 130 is not dependent on direction of movement and will result in the same frictional forces regardless of the direction traveled by the damper piston 106. Alternately, in one embodiment, the compression and rebound tuning of the first surface treatment 130 results in two different coefficients of static friction and two different coefficients of kinetic friction for the first surface treatment 130: both including a compression direction coefficient and a rebound direction coefficient.

Similarly, the adjacent portions of the damper tube next to the first portion include a second surface treatment 132 with a second coefficient of static friction that is higher than the first coefficient of static friction and a second coefficient of kinetic friction that is higher than the first coefficient of kinetic friction. In one embodiment, this second surface treatment 132 is not dependent on direction of movement and results in the same frictional forces regardless of the direction traveled by the damper piston 106. Alternately, in one embodiment, compression and rebound tuning of the second surface treatment 132 results in two different coefficients of static friction and two different coefficients of kinetic friction for the second surface treatment 132: both including a compression direction coefficient and a rebound direction coefficient.

The end portions of the damper tube repeats the same tuning process for selecting the third surface treatment 134. Any number of surface treatments is employed to provide the desired level of position-specific and piston velocity-specific damping forces.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A fluid damper shock absorber, comprising:
   a damper tube including an interior surface;
   a damper piston including a piston surface that engages the interior surface; said piston surface further comprised of:
   a wear band disposed around an outer circumference of said damper piston; and
   said piston surface including an exterior surface of the wear band;
   a first surface treatment at a first end of the interior surface of the damper tube having a first coefficient of friction with the piston surface when the damper piston is moving in a first direction and a second coefficient of friction with the piston surface, different from the first coefficient of friction, when the damper piston is moving in a second direction; and
   a second surface treatment adjacent the first surface treatment having a third coefficient of friction with the piston surface that is greater than the first coefficient of friction.

2. The shock absorber of claim 1, wherein the surface treatments include a third surface treatment adjacent the second surface treatment having a fourth coefficient of friction with the piston surface that is greater than the third coefficient of friction.

3. The shock absorber of claim 1, wherein the surface treatments include a third surface treatment adjacent the second surface treatment having a fourth coefficient of friction with the piston surface that is greater than the third coefficient of friction, said third surface treatment comprised of a coating treatment.

4. The shock absorber of claim 1, wherein the first surface treatment and said second surface treatment are comprised of a coating treatment.

* * * * *